United States Patent
Vaz et al.

(10) Patent No.: US 7,787,673 B2
(45) Date of Patent: Aug. 31, 2010

(54) METHOD AND APPARATUS FOR AIRWAY DETECTION AND SEGMENTATION USING 3D MORPHOLOGICAL OPERATORS

(75) Inventors: Michael Vaz, Hillsboro, OR (US); Atilla Peter Kiraly, Plainsboro, NJ (US)

(73) Assignee: Siemens Medical Solutions USA, Inc., Malvern, PA (US)

( * ) Notice: Subject to any disclaimer, the term of this patent is extended or adjusted under 35 U.S.C. 154(b) by 1173 days.

(21) Appl. No.: 11/299,571

(22) Filed: Dec. 12, 2005

(65) Prior Publication Data

US 2006/0159328 A1 Jul. 20, 2006

Related U.S. Application Data

(60) Provisional application No. 60/637,805, filed on Dec. 21, 2004.

(51) Int. Cl.
*G06K 9/00* (2006.01)
(52) U.S. Cl. .................................... 382/128
(58) Field of Classification Search ......... 382/128–134; 128/920–930; 250/455–465; 356/39–49
See application file for complete search history.

(56) References Cited

U.S. PATENT DOCUMENTS 7,447,343 B2 * 11/2008 Barfuss et al. ............... 382/128
2004/0252870 A1 * 12/2004 Reeves et al. ............... 382/128

OTHER PUBLICATIONS

A. P. Kiraly, et al., "3D Human Airway Segmentation Methods for Virtual Bronchoscopy," *Academic Radiology*, vol. 9, No. 10 pp. 1153-1168, Oct. 2002.
D. Mayer, et al., "Segmentation and Virtual Exploration of Tracheo-Bronchial Trees," *Proc. Of Computer Assisted Radiology and Surgery* pp. 35-40, 2003.

* cited by examiner

Primary Examiner—Samir A. Ahmed
Assistant Examiner—Atiba O. Fitzpatrick

(57) ABSTRACT

Disclosed is a method and system for detecting a structure (e.g., an airway) within an image. The method and system generate a segmented image from the original (reconstructed) image. The method and system then iteratively apply three dimensional morphological operators of varying sizes to the image to obtain a resulting image. The method and system obtain a candidate mask, apply the candidate mask to the resulting image to generate a masked resulting image, and update the segmented image using the masked resulting image to detect the structure. In one embodiment, the segmented image is generated from region growing. Also disclosed is a method to determine different regions of interest within a given segmented image based on computed projections and boundary lines of the segmented image.

8 Claims, 12 Drawing Sheets

ORIGINAL IMAGE

J, AFTER 5 ITERATIONS (ONE OPERATOR)

J INFINITY (ONE OPERATOR)

C, RESULTS FOR ONE OPERATOR SIZE

METHOD AND APPARATUS FOR AIRWAY DETECTION AND SEGMENTATION USING 3D MORPHOLOGICAL OPERATORS

This application claims the benefit of U.S. Provisional Application No. 60/637,805 filed Dec. 21, 2004, which is incorporated herein by reference.

BACKGROUND OF THE INVENTION

The present invention relates generally to airway segmentation, and more particularly to using 3-dimensional (3-D) morphology operators for airway detection and segmentation.

A Computed Tomography (CT) scan uses x-ray equipment to obtain image data from different angles around the human body and then uses computer processing of the information to produce cross-sectional images of the body tissues and organs. The image can then be analyzed by methods using morphological operators to highlight specific areas so that radiologists (or other medical personnel) can more easily diagnose problems associated with the patient such as cancers, cardiovascular disease, infectious disease, trauma and musculoskeletal disorders. Current high-resolution CT offers high resolution images of the chest and airways.

Virtual bronchoscopy (VB) systems are systems that evaluate an image of a patient's airways for the purposes of stenosis detection, stent design, guidance, or quantitative analysis. One basic precursor that can be vital to these systems is the segmentation of the airways. Segmentation of an airway is the isolation of the airway from the rest of an image. Segmentation offers the ability to later generate paths for guidance and forms a basis for quantitative measurements.

As shown in FIG. 1, the human airway tree 100 appears on a CT cross-section as a set of connected, dark, branching tubular structures that tend to decrease in diameter as the branching progresses.

Airway tree segmentation is traditionally a challenging problem. While airway voxels have a density near −1000 Hounsfield units (HU), noise and partial volume effects make it virtually impossible to use a simple threshold to identify all airway voxels within an image. Whenever mixtures of different tissue types comprise a voxel, intermediate gray-level values are the result. Voxels straddling air and airway walls typically have values above −1000 HU. These partial voxels can be resolved into tissue components through statistical methods. Moreover, due to the size of the voxel, thin or stenosed airways can appear broken or discontinuous. Finally, image reconstruction artifacts may cause the airways to appear discontinuous. Such discontinuities may cause problems during the segmentation, potentially resulting in both under- and oversegmentation errors.

Previously proposed airway segmentation methods have employed four strategies: (a) knowledge-based technologies, (b) region growing, (c) central-axis analysis, and (d) mathematical morphology. Hybrid algorithms combining two or more of these strategies also exist. Knowledge-based technologies describe structural relationships between airways and neighboring pulmonary vessels. Initially, 3-D seeded region growing is used to identify large airways. The knowledge-based rules are applied to the image on a section-by-section basis.

Region growing methods use voxel connectivity and a threshold to identify regions. In particular, region growing includes merging an initial set of points iteratively according to aggregation criteria. An arbitrary seed point is chosen and compared with neighboring points. A region is grown from the seed point by adding neighboring points that match aggregation criteria. This entire process is continued for each added point until no further additions are possible resulting in a single connected region.

Although 3-D region growing is typically extremely fast, it suffers from partial volume effects and noise due to the global threshold used during segmentation. The "optimal" thresholds differ for large versus small airways because of these factors. The resultant segmentation tends to lack finer details of the airways and contains rough edges. Further, these methods conventionally lose details, depict incomplete structures, or suffer from parenchymal leakage ("explosion") to varying degrees.

Segmentation algorithms based on central axis analysis depend on central axis estimates for computing the segmentation. The disadvantage of this method is the critical dependence on the central axis analysis results, which may be imperfect or fail.

The field of mathematical morphology involves image-processing operations that focus on shape and gray-scale properties. Airway segmentation methods that draw on mathematical morphology tend to have two or more processing phases. First, candidate airways are detected by means of various morphologic operations. Next, 3-D relationships and shape characteristics help determine the true airways from false candidates. Typically, two-dimensional (2-D) operators of varying sizes are applied to each section of the image to identify candidate airways (i.e., candidates). Next, false candidates are eliminated through 3-D reconstruction. In one form of reconstruction, a region growing is performed on thresholded candidates with the seed point placed in the trachea. One potential pitfall with this approach is oversegmentation of the airways via false candidates. Further, most morphology-based methods require heavy computation times.

BRIEF SUMMARY OF THE INVENTION

The present invention is a method and system for detecting a structure (e.g., an airway) within an image. The method and system generate a segmented image from the image. The method and system then iteratively apply three dimensional morphological operators of varying sizes to the image to obtain a resulting image. The method and system generate a candidate mask, apply the candidate mask to the resulting image to generate a masked resulting image, and update the segmented image using the masked resulting image to detect the structure.

In one embodiment, region growing is performed to obtain a preliminary segmented image from the original image. The image is received (e.g., from a CT scan) and thresholded to generate the candidate mask. The structure may be, for example, an airway along with airway-like objects. The iterative application of three-dimensional morphological operators further includes performing a gray scale closing with the image and an operator to obtain a detection image. A gray scale erosion is then performed with the image, the operator, and the detection image to obtain the resulting image. The size of the operator is changed to detect objects of corresponding scale.

The (original) image is then subtracted from the resulting image to obtain a difference image and the difference image is thresholded. In one embodiment, applying the candidate mask includes performing an AND operation between the candidate mask and the result of the thresholding of the difference image. In one embodiment, updating the segmented image further includes performing an OR operation between the segmented image and the result of the AND operation.

True candidates are then isolated from the segmented image. In one embodiment, the isolating of the true candidates includes taking the largest component in the segmented image. In one embodiment, this candidate isolation can occur in between applications of operators, while in another embodiment, this step can occur as a single final step.

In another embodiment, a region of interest comprising at least a portion of a segmented structure (e.g. airway) is determined from a segmented image. A three-dimensional structure segmentation is performed on an image. Next, a coronal projection of the three-dimensional structure segmentation is generated. Boundary lines defining the region of interest are generated by determining profiles of the coronal projection. The profiles may include an upper profile, a lower profile, an upper cumulative profile, and/or a lower cumulative profile. The boundary lines further include upper boundary lines, lower boundary lines, and a middle boundary line. The middle boundary line divides the segmented structure into a right structure and a left structure.

In one embodiment, the upper cumulative profile is determined by determining the highest level of the upper profile. The lower cumulative profile is determined by determining the lowest level of the lower profile. In one embodiment, a shaping window is created. The lower profile may then be multiplied by the shaping window. In one embodiment, a coronal diameter of the coronal projection is determined. The shaping window may then have a non-zero value for the span of the coronal diameter. The lower profile may be determined by traversing columns of the coronal projection and determining the lowest pixel in each of the columns. The upper profile is determined by traversing the columns of the coronal projection and determining the highest pixel in each of the columns.

These and other advantages of the invention will be apparent to those of ordinary skill in the art by reference to the following detailed description and the accompanying drawings.

DETAILED DESCRIPTION

Figure 1:
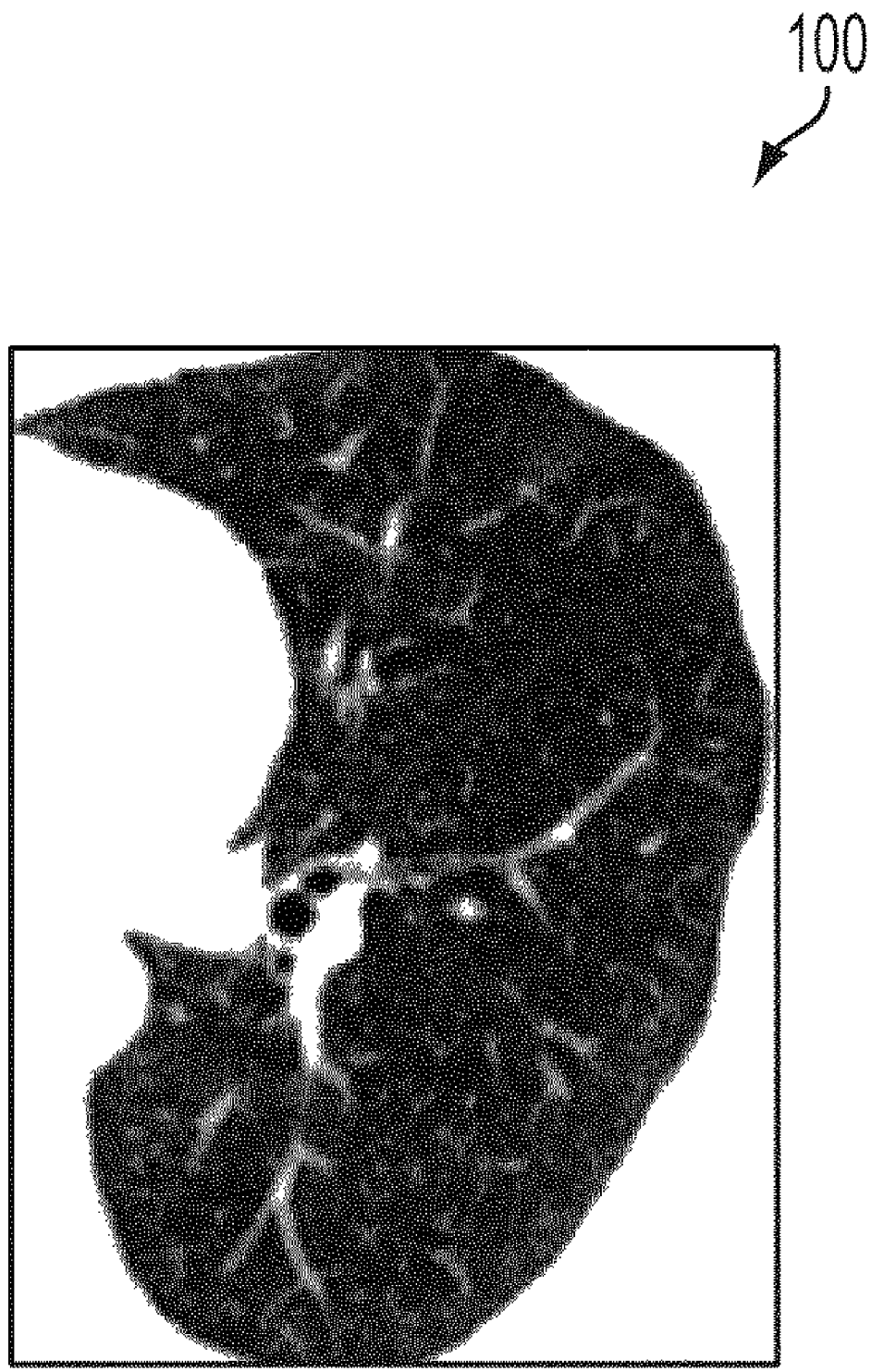
FIG. 1 shows a structural diagram of a human airway tree.
Figure 2:
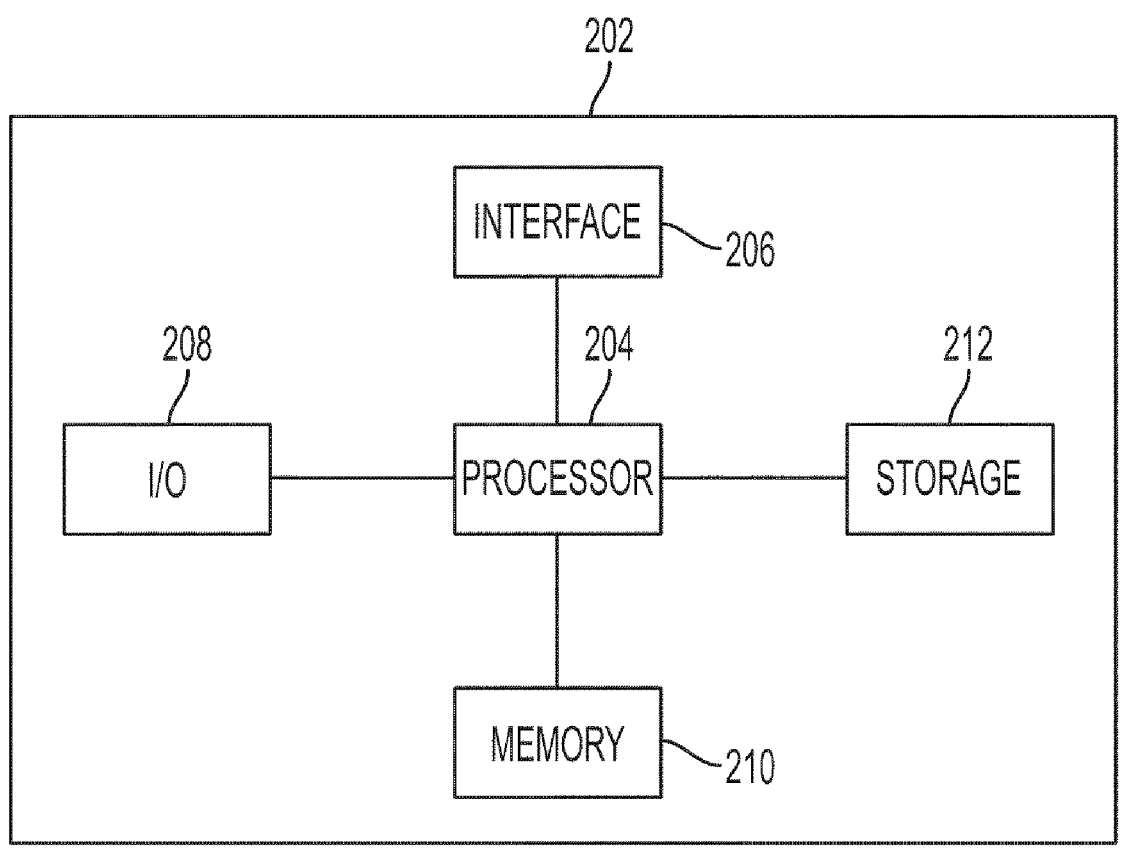
FIG. 2 is a high level block diagram of a computer in accordance with an embodiment of the invention.

The following description describes the present invention in terms of the processing steps required to implement an embodiment of the invention. These steps may be performed by an appropriately programmed computer, the configuration of which is well known in the art. An appropriate computer may be implemented, for example, using well known computer processors, memory units, storage devices, computer software, and other components. A high level block diagram of such a computer is shown in FIG. 2. Computer 202 contains a processor 204 which controls the overall operation of computer 202 by executing computer program instructions which define such operation. The computer program instructions may be stored in a storage device 212 (e.g., magnetic disk) and loaded into memory 210 when execution of the computer program instructions is desired. Computer 202 also includes one or more interfaces 206 for communicating with other devices (e.g., locally or via a network). Computer 202 also includes input/output 208 which represents devices which allow for user interaction with the computer 202 (e.g., display, keyboard, mouse, speakers, buttons, etc.). One skilled in the art will recognize that an implementation of an actual computer will contain other components as well, and that FIG. 2 is a high level representation of some of the components of such a computer for illustrative purposes. In addition, one skilled in the art will recognize that the processing steps described herein may also be implemented using dedicated hardware, the circuitry of which is configured specifically for implementing such processing steps. Alternatively, the processing steps may be implemented using various combinations of hardware and software. Also, the processing steps may take place in a computer or may be part of a larger machine (e.g., a medical imaging machine).

A brief introduction to a prior art approach to the application of morphological operators is described below. In one embodiment, the prior art approach is described in A. P. Kiraly, E. A. Hoffman, G. McLennan, W. E. Higgins, and J. M. Reinhardt, "3D Human Airway Segmentation Methods for Clinical Virtual Bronchoscopy," Academic Radiology, Vol. 9, No. 10, pp. 1153-1168 (2002), which is incorporated herein by reference. The prior art approach proceeds in two major steps. First, candidate airways (i.e., candidates) are selected via 2-D morphological operators that are of different sizes for detecting airways of different sizes and appended to an initial region growing segmentation result. Next, a reconstruction process is used to eliminate false candidates and produce the final segmentation.

Candidate airway locations are determined on a 2-D basis by means of gray-scale reconstruction followed by thresholding. The basis operator for the reconstruction is given by a binary four-connected neighborhood, $B_4$, the smallest element used in the process. Larger elements are computed with repeated dilations of $B_4$ as follows:

$$B_4^b = bB_4 = B_4 \oplus B_4 \oplus \ldots \oplus B_4,$$

where $bB_4$ is the bth-order homothetic of $B_4$ (i.e., $bB_4$ is a geometric expansion or contraction of $B_4$, depending on b).

An operator $B_4^b$ is applied to each individual (2D) section as described below. Given the original image I, each section z=1, ..., Z of I is windowed (−1000, 0) to form a new 2-D image S, where $$S(x, y) = \begin{cases} I(x, y, z) & \text{if } I(x, y, z) \le 0 \\ 0 & \text{otherwise.} \end{cases}$$

Windowing is used to eliminate the effect of variations in more dense structures, such as bone. A marker image for gray-scale reconstruction, $J_1$, is then obtained from the gray-scale closing of S with structuring element $B_4^b$, $$J_1^b = S \cdot B_4^b = (S \oplus B_4^b) \ominus B_4^b.$$

Hence, $J_1^b$ is computed from the gray-scale dilation by means of $B_4^b$ followed by an erosion by the same operator. Next, $J_2^b$ is computed from $J_1^b$ with the following:

$$J_{k+1}^b = \max(J_k^b \ominus B_4, S),$$

where the right side of the equation computes the voxel-by-voxel gray-level maximum.

The above equation is repeated until no further changes occur; that is, $$J_\infty^b(x,y) = J_{k+1}^b(x,y) = J_k^b(x,y), \forall (x,y) \in J_k^b,$$

where $J_\infty^b$ represents the final gray-scale reconstructed image with structuring element $B_4^b$. In this image, local minima smaller than $B_4^b$ in S are filled in with a gray-level value proportional to the difference between the maximum and minimum gray levels computed within a $B_4^b$-sized neighborhood of the minima.

A gray-scale difference image is then computed between $j_\infty^b$ and S and thresholded:

$$C^b(x, y) = \begin{cases} 1, & \text{if } J_\infty^b(x, y) - S \ge T_M. \\ 0, & \text{otherwise.} \end{cases}$$

The difference image is bright where local minima exist in the image S. In this case, since the data windowed was between 0 and −1000, the threshold value is 200.

Finally, the union of all the candidates obtained from all of the operators is taken to create the final image C:

$$C(x, y) = \bigcup_{b=1}^{M} C^b(x, y)$$

Figure 3:
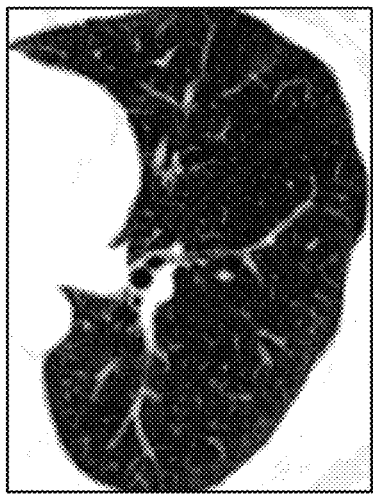
FIG. 3 shows exemplary images corresponding to the transition from an original image to a final image of candidates using a prior art approach to segmentation.
Figure 3:
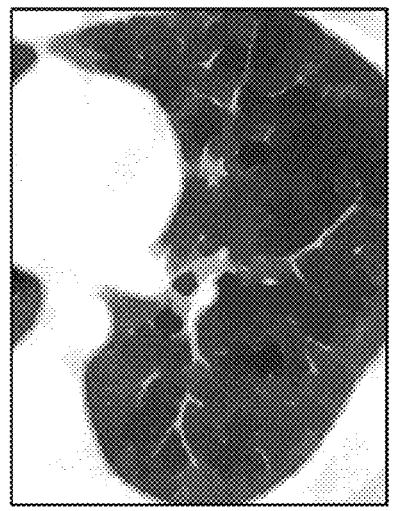
Figure 3:
Figure 3:
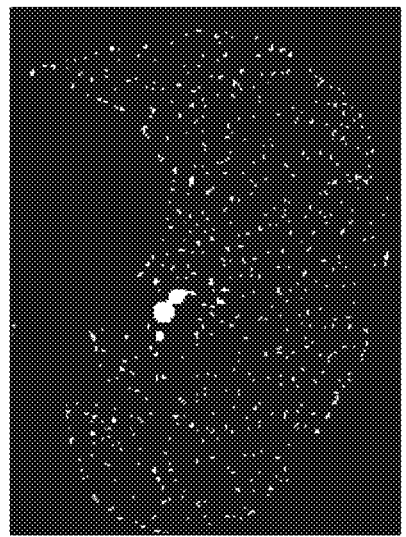

The image C is then reconstructed to eliminate false candidates and later fused with the region growing segmentation for the final result. FIG. 3 shows exemplary images corresponding to the transition from the original image 304 to the J image 308 after five iterations (using one operator) to the J infinity image 312 to an image $C^b$ obtained from a specific operator size b 316 using the prior art approach to segmentation. The white regions (circles, spots, speckle) are potential airway candidates. The collection of these 2-D results will then be considered in unison to identify the true airway.

Unlike the prior art approach, which uses 2-D operators, the present invention uses 3-D morphological operators. The use of 3-D morphological operators allows for more image information to be used in context in order to detect airway candidates. Additionally, the threshold is varied based on operator size and the reconstruction stage is merged with the first stage and is iteratively applied as the results from each operator are computed.

The 3-D operator algorithm is based on simultaneously considering multiple adjacent sections (i.e., slices) of the original image. Thus, if a dark spot is present on one slice of the original image (e.g., a dark spot associated with a packet of fat) but is not present on other slices of the image, the 3-D operator algorithm determines that this dark spot is not an airway. Unlike a 2-D operator algorithm, which may determine that the dark spot is an airway because of the examination of that single slice of the image, the 3-D operator algorithm is applied to multiple slices of the image so that a dark spot present on a single slice will not be considered as an airway.

Figure 4:
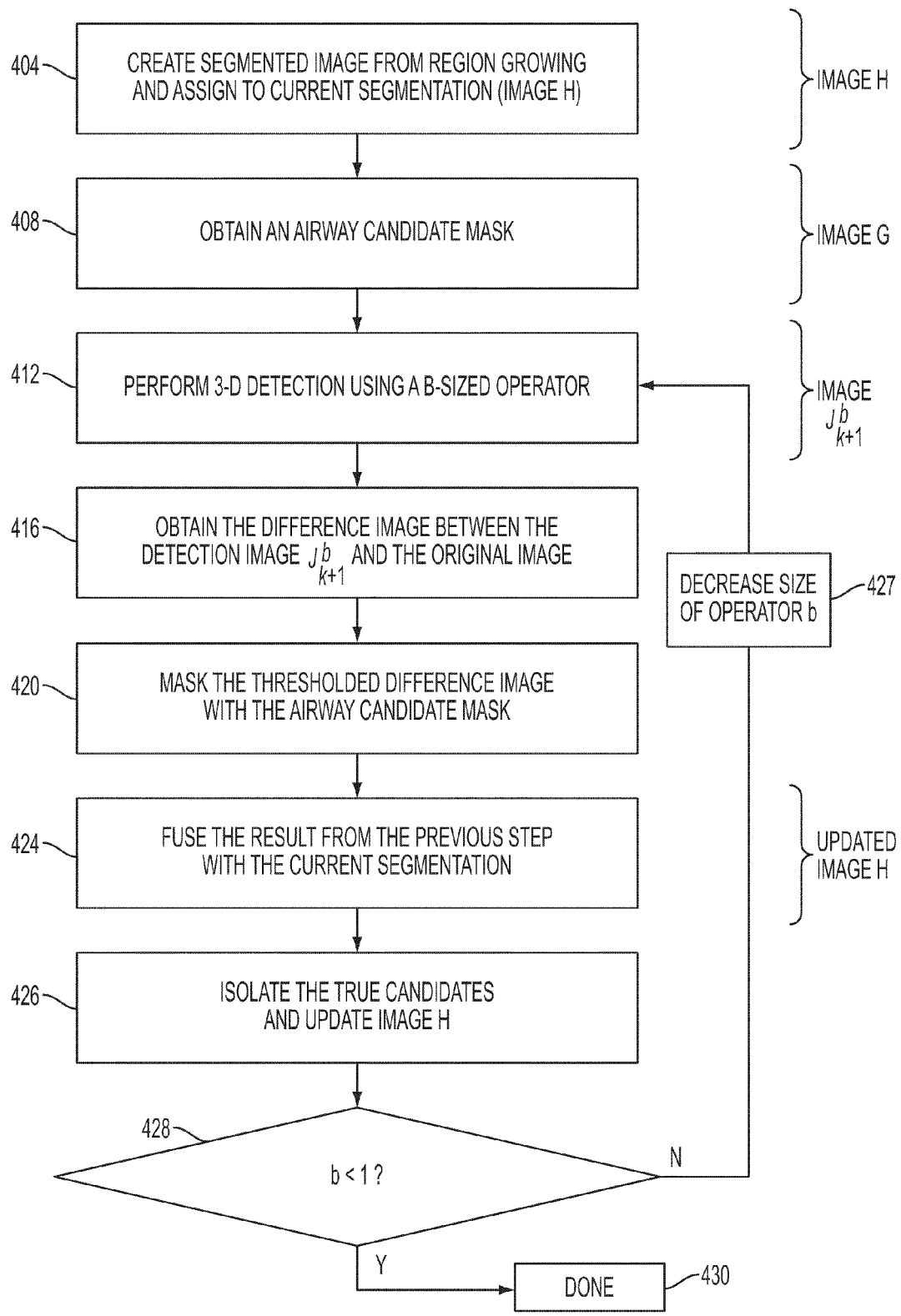
FIG. 4 shows a flowchart of the steps performed by the computer to perform the 3-D operator algorithm in accordance with an embodiment of the invention.
Figure 5A:
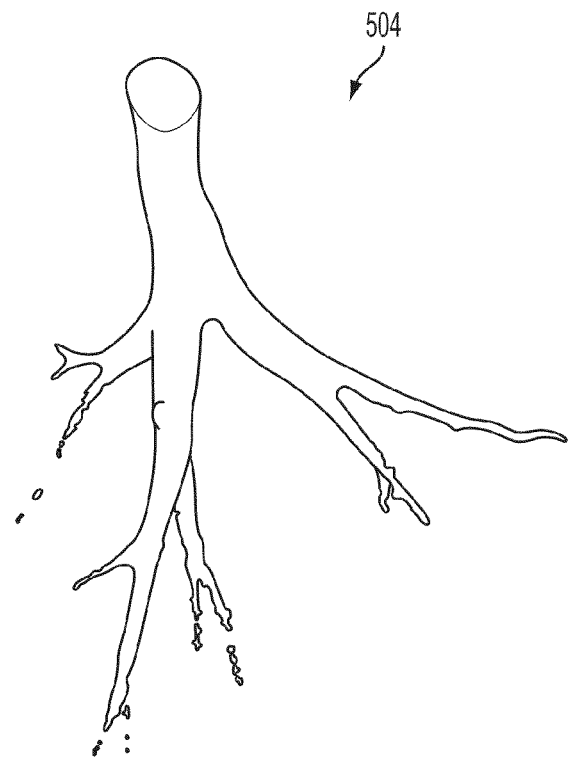
FIG. 5A is a rendering of a segmented image produced by region growing in accordance with an embodiment of the invention.
Figure 5B:
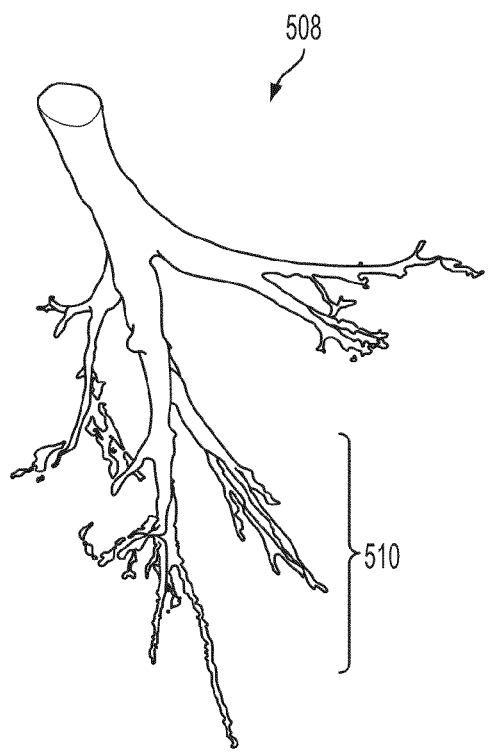
FIG. 5B is a rendering of an image of a segmented airway in accordance with an embodiment of the invention.

FIG. 4 shows a flowchart of the steps performed for the 3-D operator algorithm. First, an original image I of the chest (i.e., airways) is obtained from a CT scan. To create an initial estimate segmentation of the major airways image (and thereby create a segmented image), region growing is performed at a seed point (e.g., at the trachea) in step 404. As shown in FIG. 5A, the region growing image 504 typically only grows to a particular area and does not cover the smaller airways (e.g., airway 510) present in a segmented image 508 of FIG. 5B. FIG. 5B shows a rendering of a segmented airway and therefore does not show the rest of the image (that may have other dark areas, such as correlating to emphysema). Image 504 depicts a surface rendering of the results obtained from region growing image which is assigned to the "current segmentation" (also referred to below as image H) that provides an initial segmentation that will be completed during later steps.

An airway candidate mask (also referred to as image G) is then obtained in step 408. The airway candidate mask is obtained by performing a threshold on the original image I:

$$G(x,y,z)=1 \text{ if } I(x,y,z) \le \text{AirThreshold, 0 otherwise}$$

In one embodiment, a threshold of −675 HU is used. Alternatively, a threshold of −775 HU is used. This thresholding step may be performed at any time during the algorithm before image G is required—it is only performed once and used by all iterations.

Candidates for airways are then determined by a specific-sized operator. Note that these candidates may include airways already defined in image H, but the goal is to find additional airways. This determination is made by using a 3-D, b-sized operator on the original image I in step 412 and as shown below:

$$J_1^b = I \cdot B_4^b = (I \oplus B_4^b) \ominus B_4^b$$

$$J_{k+1}^b = \max(J_k^b \ominus B_4, I)$$

Note in this case that the operator of size b is not necessarily obtained from repeated dilations and can be uniquely obtained. For example, b could correspond to the radius of a sphere that is digitized to create the operator. It can also be elliptical in the case of anisotropic data.

The difference image between the image $J_{k+1}^b$ (also referred to below as the resulting image) and the original image I is then calculated in step 416. The difference image is then thresholded. The threshold varies for different b, and typically decreases as b decreases.

$$C^b(x,y,z)=1 \text{ if } J_\infty^b(x,y,z)-I \ge T_c^b, \text{ 0 otherwise}$$

The thresholded difference image is then masked (i.e., ANDed) with the airway candidate mask in step 420 to generate a masked resulting image.

$$C^b(x,y,z)=C^b(x,y,z)\cdot G(x,y,z)$$

Image H is then updated with the image generated in the previous step (the masked resulting image) in step 424 by ORing.

$$H(x,y,z)=H(x,y,z)|C^b(x,y,z)$$

The above steps are iterated for different sized structuring elements. For example, the computer 202 may empirically determine that the largest operator that had useful additions to the region growing was a sphere with a discrete radius of 3 (0.5 mm scale). The above steps are iteratively performed using operators of different sizes (e.g., of radius 3, 2, and 1 in that order). Thus, the iterations progress for operator size $b \subset \{M, M-1, \ldots 1\}$, where M is the determined maximum operator size that had useful additions to the region growing image H.

The next step is to isolate the true candidates from the image in step 426. In one embodiment, the largest connected component is extracted in step 426. Image H is then updated with the true candidates.

The size of the operator is then compared to 1 in step 428. If the size b is greater than or equal to 1, then another iteration is performed after the size is decreased (e.g., by one) in step 427. If the size b is less than 1, then the last iteration has been performed. Hence, unlike previous methods, the candidate isolation occurs iteratively along with each operator.

Figure 6A:
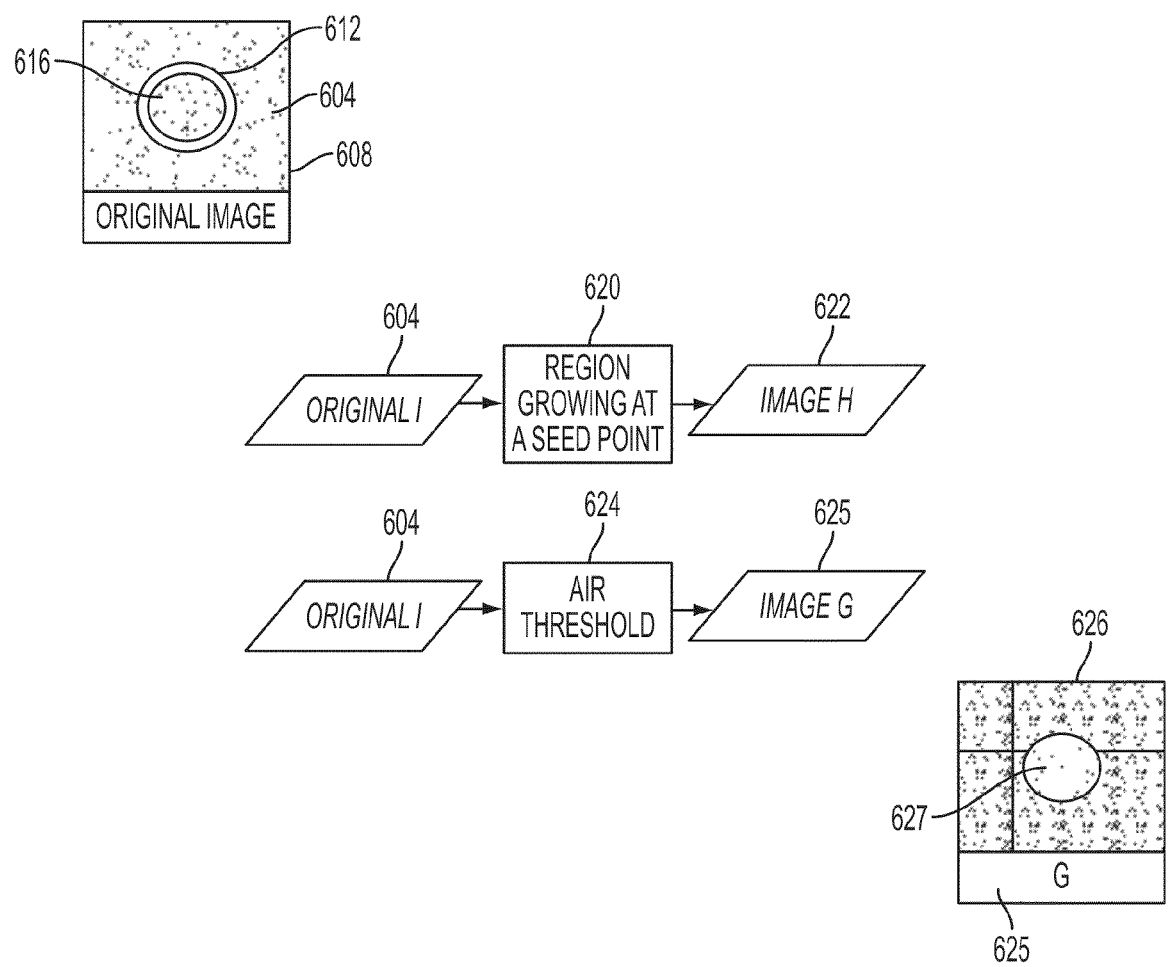
FIG. 6A is a block diagram showing the initialization steps before the iterative algorithm is performed in accordance with an embodiment of the invention.
Figure 6B:
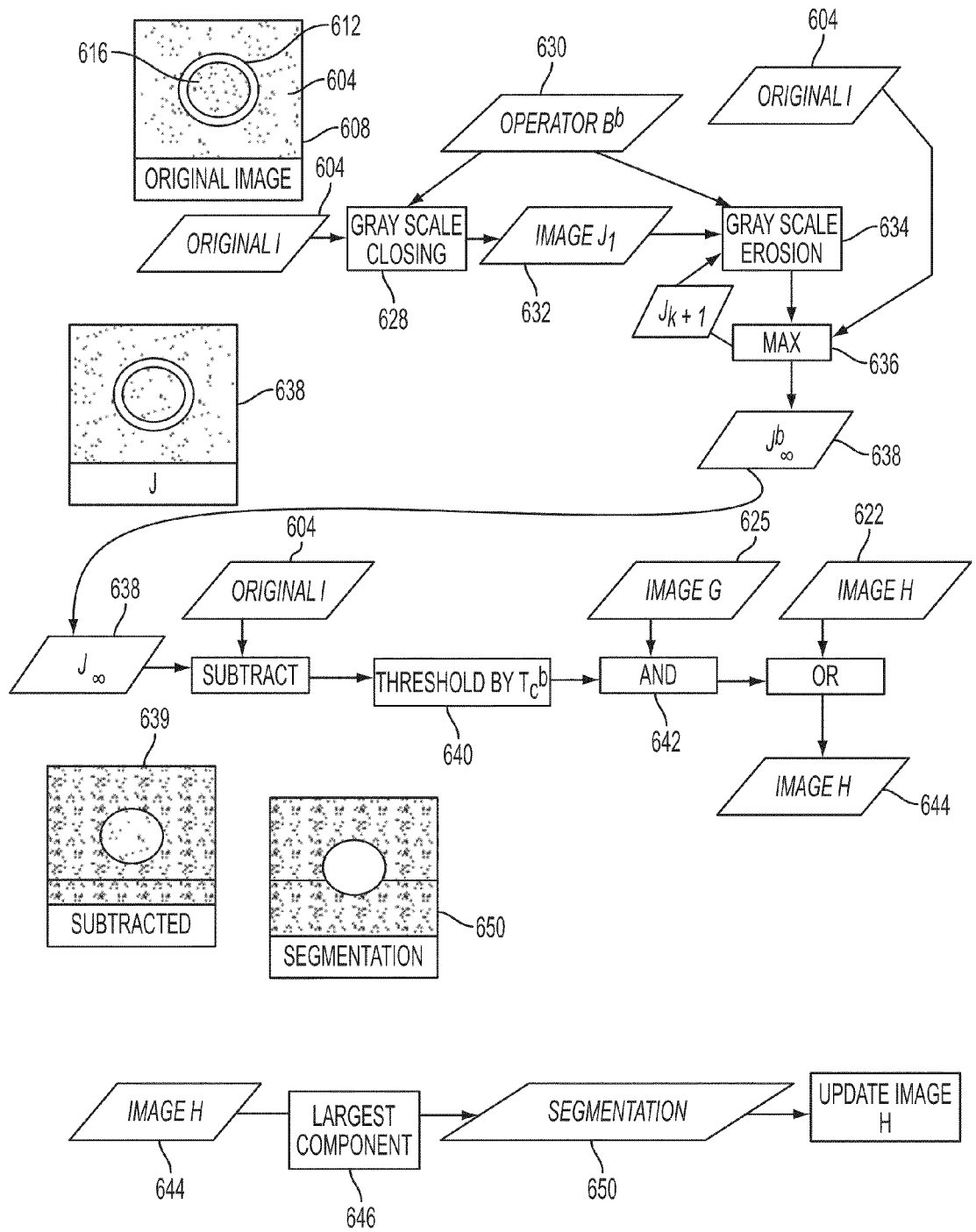
FIG. 6B is a block diagram of an iterative algorithm to produce a final image of a segmented airway in accordance with an embodiment of the invention.

FIGS. 6A and 6B show more detailed flow charts illustrating an embodiment of the algorithm used to generate the airway segmentation. FIG. 6A shows the initialization steps before the iterative algorithm is performed. As described above, an original image I 604 is obtained via a CT scan of the chest. In this example, showing a synthetic cross-section of an airway, the original image 604 includes a gray background 608, a gray outer ring 612, and a black inner circle 616. In one embodiment, a 2-D slice of an airway is shown as a sample of a 2D section of the 3D image. Region growing is then performed at a seed point in step 620. A segmented image H 622 is set to the region growing result.

An air threshold is also performed on the original image I 604 in step 624 to capture air-like regions of the original image I 604. The resulting image G 625 has a black background 626 and a white inner circle 627 for this example. In general, it is white for all voxels that were less than the threshold in the original image. The purpose of this image is to define potential candidates based on gray level values.

FIG. 6B shows a block diagram of an iterative algorithm to produce a final image of a segmented airway. A gray scale closing is performed on the original image in step 628 using the operator described above, Bb 630. This closing 628 produces detection image $J_1$ 632 for the first operator. A gray scale erosion with the operator Bb 630 is then performed in blocks 634 followed by a MAX operation with the original image I on the detection image $J_1$ 632 as well as the original image 604. This loop is repeated until the input image into the MAX operation 636 is unchanged. The result is a resulting image $J_\infty^b$ 638 which is referred to as $J_\infty$ 638 for the remainder of the iteration. The resulting image J 638 has a gray background, a gray outer ring and a gray inner circle in this example. In general, some darker portions of the image become brighter.

The computer 202 subtracts the original image 604 from the resulting image 638 to produce a subtracted or difference image 639. The subtracted image 639 has a black background and a gray inner circle in this example. The subtracted image 639 is then thresholded to generate a thresholded image 640. The computer masks (i.e., performs an AND operation on) the thresholded image 640 with the airway candidate mask G 625, as shown with step 642, to generate a masked resulting image. The masked resulting image is ORed with the current segmented image H 622 to produce a new segmented image 644. This image is iteratively updated as the operator size b is adjusted. Once the iterations are complete, the true candidates are isolated from the segmented image H 622. In one embodiment, the largest component 646 in the image is taken to create a segmented image 650. The segmented image 650 has a black background and a white inner circle in this example, thereby segmenting the airway (i.e., the white inner circle). This image 650 is used to update image H. If necessary, the process is iterated more than once. Further, this operation can occur during each iteration of operator sizes.

Because all operations are performed in 3-D, the initial segmentation is iteratively grown by decreasing the operator size and updating the segmentation for each operator size. This algorithm enables the avoidance of more false positives than if the computer 202 used only 2D operators as done in the prior art algorithm. Further, morphological operations with much larger structuring elements are avoided since the initial segmentation created from region growing already contains the larger airways.

The main parameters involved for candidate selection are:
1. M, the maximal size of the operators (e.g., set to 3 but will increase as the resolution of the input image increases).
2. $T_c^b$, the threshold for the detection difference image at each iteration. This is different for every iteration and typically decreases along with b.
3. The connectivity constraint for extracting the largest connected component in the last step. This may be different for different iterations.

In one embodiment, the 3-D operator algorithm requires a significant amount of the computer's memory to execute. To solve this problem, the computer 202 may crop the entire thoracic volume to a region of interest (ROI) which, in this case, is the lung region that contains identifiable airways. If further partitioning were necessary, separate bounding boxes for the left and right airway tree may be identified.

Figure 7:
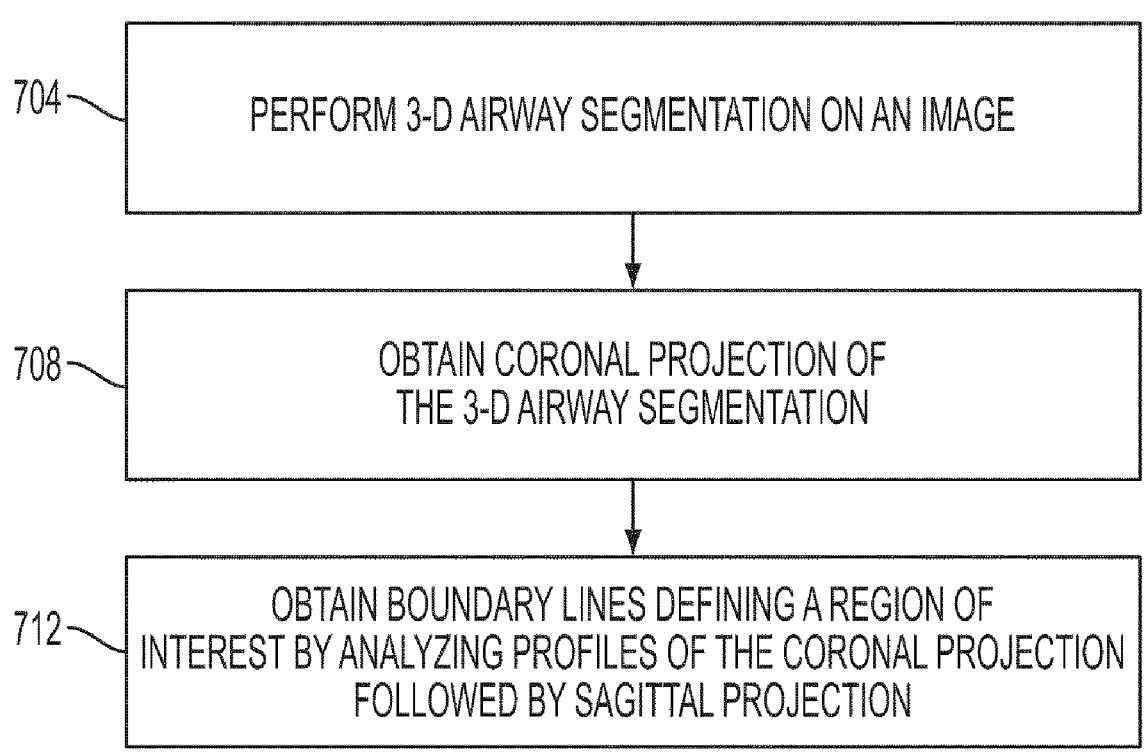
FIG. 7 shows a flow chart illustrating the steps performed by the computer to crop the volume of a segmented image in accordance with an embodiment of the invention.

FIG. 7 shows a flow chart illustrating the steps for determining, from a segmented airway image, a region of interest having at least some of the segmented airway (i.e., volume cropping). The computer 202 performs a 3-D airway segmentation on an image as described above in step 704. The computer 202 obtains a coronal projection of the 3-D airway segmentation in step 708. The computer 202 then determines boundary lines defining the region of interest by determining profiles of the coronal projection followed by sagittal projection in step 712.

The profiles include an upper profile, a lower profile, an upper cumulative profile, and a lower cumulative profile. The boundary lines can include upper boundary lines, lower boundary lines, and a middle boundary line that divides the segmented airway into a right airway and a left airway. The determination of an upper cumulative profile includes determining the highest level of the upper profile. The determination of the lower cumulative profile includes determining the lowest level of the lower profile. The region of interest is defined by the boundary lines and may include any portion of the airway.

Figure 8:
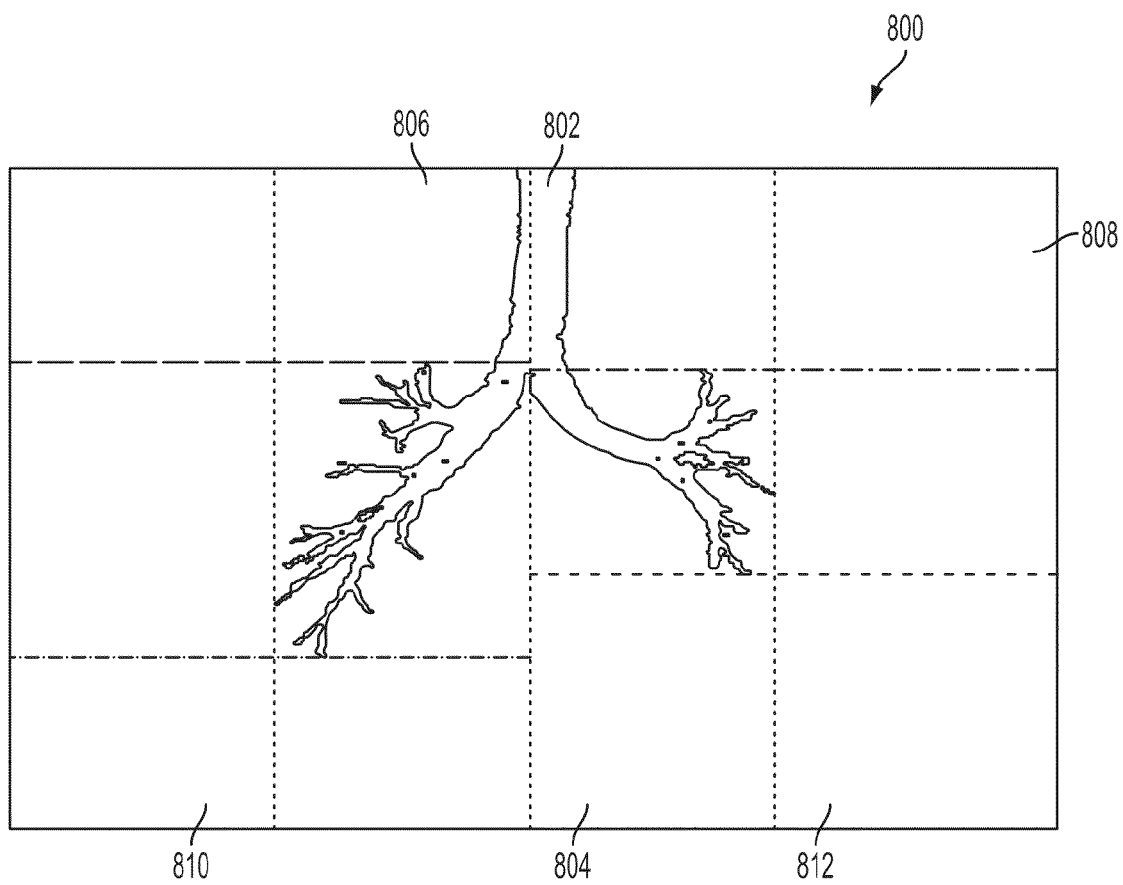
FIG. 8 is a coronal projection image of a segmented airway tree with automatically determined regions in accordance with an embodiment of the invention.

FIG. 8 shows a diagram of a segmented airway tree obtained using region growing. The diagram is a coronal maximum intensity projection (MIP) 800 of segmented airway tree 802. Vertical line 804 separates the left from the right airway, while the upper horizontal lines 806, 808 provide the upper bounds of the left and right airway tree separately.

Figure 9:
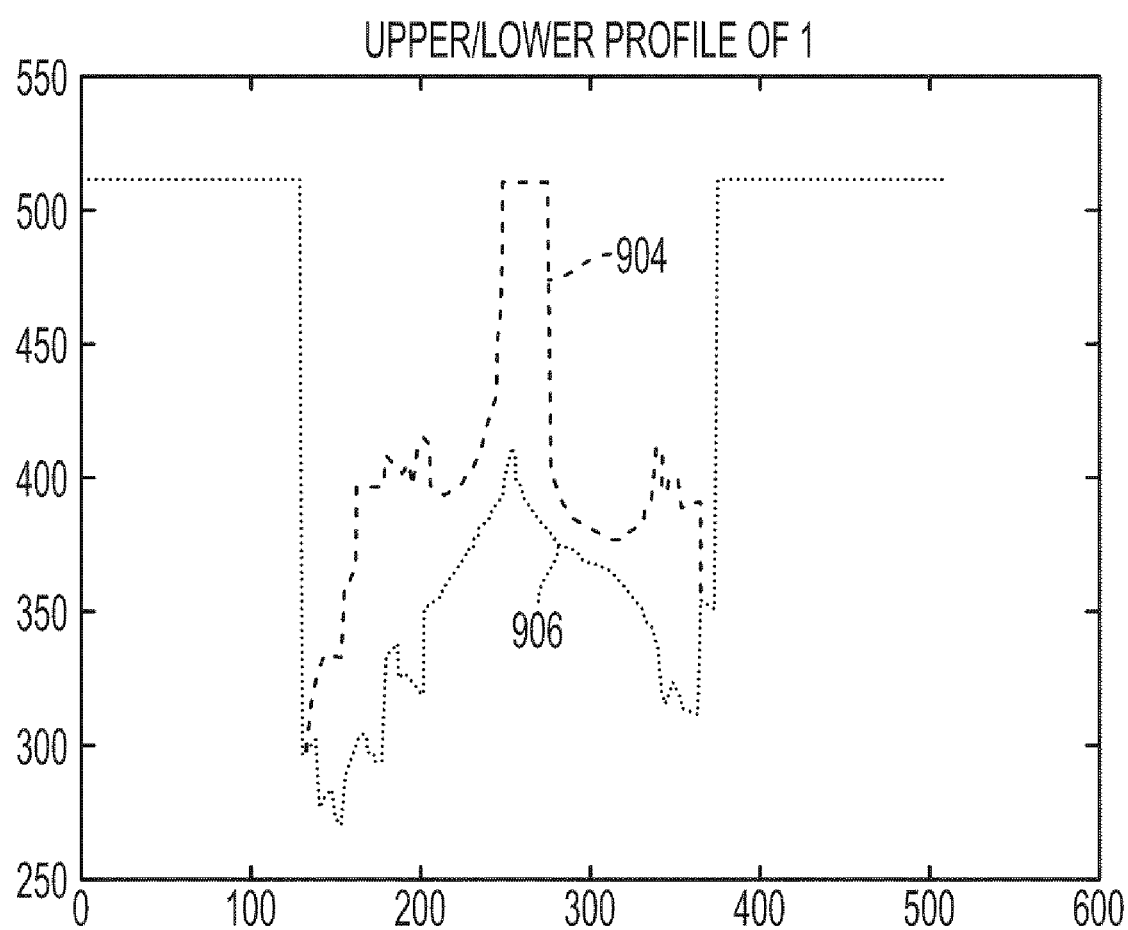
FIG. 9 is a graphical representation of upper and lower profiles of the segmented airway tree in accordance with an embodiment of the invention.

In one embodiment, the computer 202 determines the upper and lower profiles of the coronal airway segmentation MIP 800. FIG. 9 shows a graph of the upper profile 904 and the lower profile 906. The lower profile 906 is obtained by traversing the columns of the MIP 800 and noting the height at which the lowest airway pixel is located in each pixel column. The upper profile 904 is obtained by traversing the pixel columns of the MIP and locating the highest airway pixel of each column.

Figure 10:
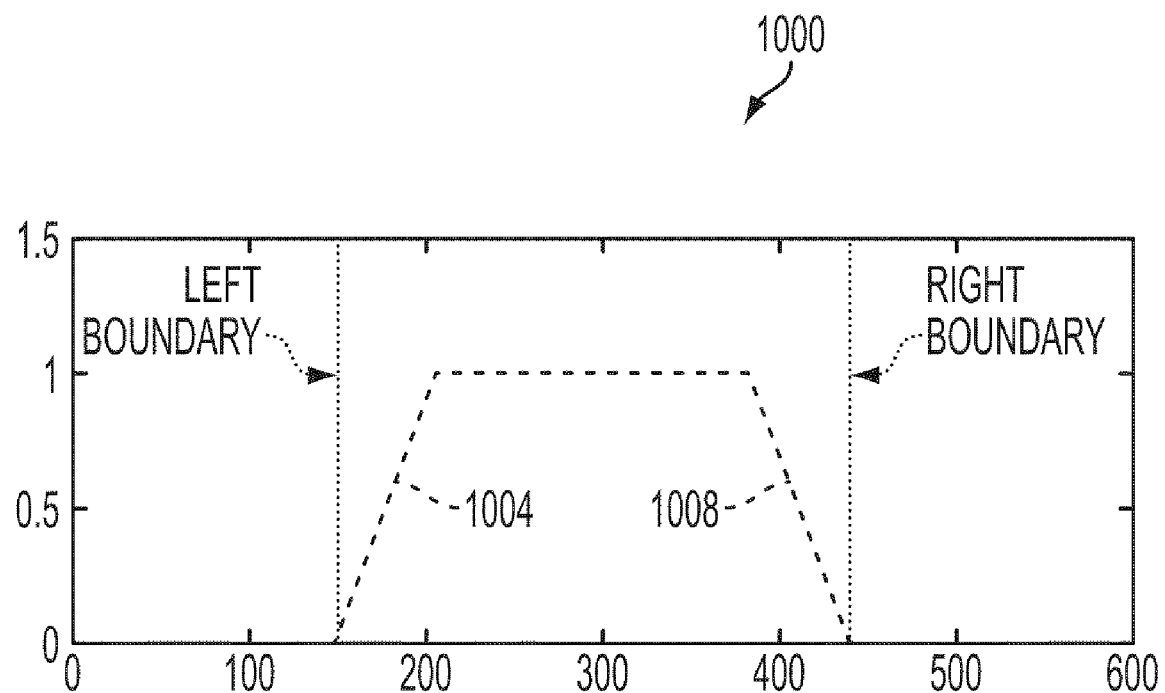
FIG. 10 is a graphical representation of a shaping window in accordance with an embodiment of the invention.

The highest point of the lower profile is typically where the trachea splits. With a more extensive segmentation, however, a branch at the leftmost or rightmost end may have the highest elevation. Therefore, the lower profile is multiplied with a shaping window such that the highest point in the shaped profile coincides with the point at which the trachea splits into the left and right airway. In FIG. 8, the left boundary and right boundary of the airway tree are shown as vertical lines 810, 812. The distance between the left boundary and the right boundary is the coronal diameter of the airway tree. In one embodiment, the shaping window is set to a non-zero value for the span of the coronal diameter. FIG. 10 shows an exemplary shaping window 1000 having a linear ramp 1004, 1008 for the outer 20% of the coronal diameter on either side.

Figure 11:
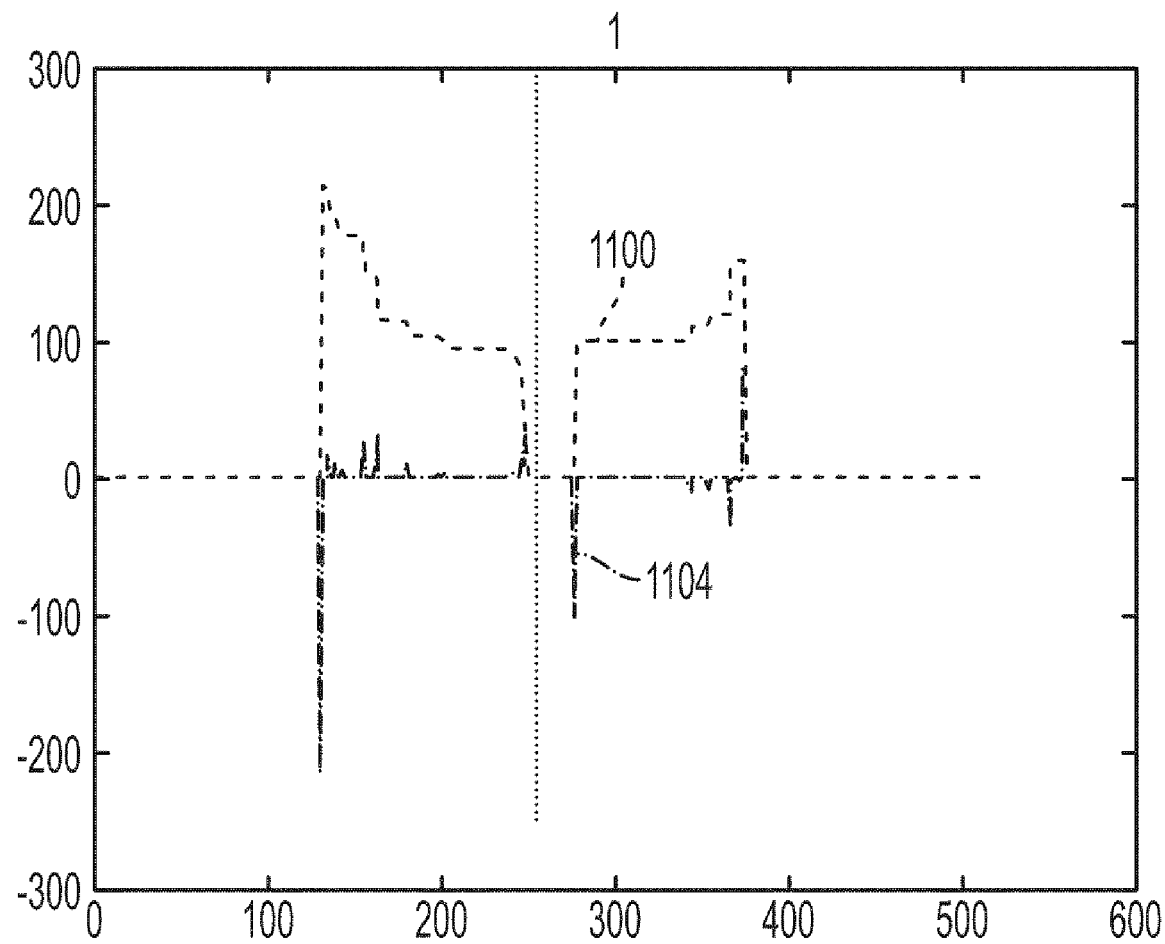
FIG. 11 is a graphical representation of an upper cumulative profile in accordance with an embodiment of the invention.

To obtain the horizontal boundary lines 806, 808, the computer 202 analyzes the upper profile 904 of FIG. 9. The computer 202 creates an upper cumulative profile by traversing the upper profile 804 from the outside towards the left/right splitting boundary 802. At each point, the value of the upper cumulative profile is the highest level that the computer 202 sees thus far when traversing the upper profile 904: i.e., it is the maximum level seen considering the section of the upper profile 904 that is bounded by the relevant outer boundary and the current point. The traversal of the upper profile 904 results in an upper cumulative profile, shown as the upper curve 1100 in FIG. 11. The upper cumulative profile is flipped and the top of the trachea is set at level 0. Thus, the obtained boundary levels will be relative to the top of the trachea. The desired boundary is the line that touches the upper most distal airway of the airway tree of either side. Referring to curve 1100, it is a rather long run in the upper cumulative profile that is proximal to the trachea, or equivalently, to boundary 802. Similar to the motivation that led to the shaping window in FIG. 10, the region of the upper curve 1100 that is to be used to obtain boundary lines 806 and 808 can be specified in terms of percentages of the airway tree width and relative to boundary 802. The lower curve 1104 shows the first difference of curve 1100—specifically, the spikes in 1104 denote a change in level in curve 1100. This information is typically simpler to analyze in light of prior knowledge—to define the region of 1100 that dictates the boundary lines 806 and 808. Once the boundary values that can be found using a coronal MIP have been obtained, the next step is to obtain the anterior and posterior boundaries for the left and the right airway. The computer 202 uses the boundaries (especially the left and right splitting boundary) to obtain separate sagittal Maximum Intensity Projection (MIPS) for the left and right airway trees. Once these sagittal MIPS are available, the required boundaries are obtained.

The boundary requirements can be subdivided further into quadrants or even further subdivisions for stricter memory requirements of the computer 202. These further subdivisions can be used to set custom parameters for region growing, morphology, or other operations to provide better results.

Thus, the advantage of volume cropping is the ability to focus separately on different regions of the airway segmentation for speed and memory efficiency.

Although the above algorithms are described in terms of an airway, they may equally be applied to any structure in an image.

The foregoing Detailed Description is to be understood as being in every respect illustrative and exemplary, but not restrictive, and the scope of the invention disclosed herein is not to be determined from the Detailed Description, but rather from the claims as interpreted according to the full breadth permitted by the patent laws. It is to be understood that the embodiments shown and described herein are only illustrative of the principles of the present invention and that various modifications may be implemented by those skilled in the art without departing from the scope and spirit of the invention. Those skilled in the art could implement various other feature combinations without departing from the scope and spirit of the invention.

The invention claimed is:

1. A method for detecting airways within an original image of a chest, comprising:
    generating a segmented image of an airway from said original image using region growing;
    generating a candidate mask; and
    iteratively detecting additional airways in said original image by performing a plurality of iterations, each iteration comprising:
        detecting airway candidates by applying a three dimensional morphological operator to said original image to obtain a resulting image of said airway candidates wherein a size of the 3D morphological operator varies with each iteration;
        applying said candidate mask to said resulting image to generate a masked resulting image; and
        updating said segmented image of said airway using said masked resulting image to detect said airways.

2. The method of claim 1 wherein said candidate mask is generated by thresholding said original image.

3. The method of claim 1 wherein said detecting airway candidates in said original image by applying a three dimensional morphological operator further comprises performing a gray scale closing with said original image and the three dimensional morphological operator to obtain a detection image.

4. The method of claim 3 wherein said detecting airway candidates in said original image by applying a three dimensional morphological operator further comprises performing a gray scale erosion with the three dimensional morphological operator and said detection image and then determining a voxel-by-voxel maximum gray-level value between a result of said gray scale erosion and said original image to obtain said resulting image.

5. The method of claim 4 wherein said iteratively detecting additional airways in said original image further comprises, at each iteration:
    subtracting said original image from said resulting image to obtain a difference image.

6. The method of claim 5 wherein said iteratively detecting additional airways in said original image further comprises, at each iteration:
    thresholding said difference image using a threshold that varies with each iteration.

7. The method of claim 1 wherein said iteratively detecting additional airways in said original image further comprises, at each iteration:
    isolating true candidates from said segmented image.

8. The method of claim 7 wherein said isolating of said true candidates further comprises taking a largest component in said segmented image.

* * * * *